United States Patent
Son et al.

(10) Patent No.: US 8,281,042 B2
(45) Date of Patent: Oct. 2, 2012

(54) MEMORY DEVICE AND MANAGEMENT METHOD OF MEMORY DEVICE

(75) Inventors: Min Young Son, Seoul (KR); Gyu Sang Choi, Seoul (KR); Jae Don Lee, Paju-si (KR); Choong Hun Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 177 days.

(21) Appl. No.: 12/470,574

(22) Filed: May 22, 2009

(65) Prior Publication Data

US 2010/0146163 A1   Jun. 10, 2010

(30) Foreign Application Priority Data

Dec. 5, 2008   (KR) .................. 10-2008-0123217

(51) Int. Cl.
*G06F 3/00* (2006.01)
(52) U.S. Cl. .............. 710/5; 710/20; 710/21; 710/33; 710/52; 710/56; 710/57; 710/62
(58) Field of Classification Search .............. 710/5, 20, 710/21, 33, 52, 56, 57, 62
See application file for complete search history.

(56) References Cited

U.S. PATENT DOCUMENTS

| | | | | |
|---|---|---|---|---|
| 5,619,690 A * | 4/1997 | Matsumani et al. ............... 1/1 | | |
| 6,453,404 B1 * | 9/2002 | Bereznyi et al. .............. 711/171 | | |
| 6,851,010 B1 * | 2/2005 | Rao et al. ........................ 711/3 | | |
| 7,039,766 B1 * | 5/2006 | Smith ........................ 711/137 | | |
| 7,313,654 B2 * | 12/2007 | Zohar et al. .................... 711/134 | | |
| 7,516,254 B2 * | 4/2009 | Nanki et al. ..................... 710/52 | | |
| 2005/0251625 A1 * | 11/2005 | Nagae et al. .................. 711/129 | | |
| 2007/0067562 A1 * | 3/2007 | Ohsaki et al. ................. 711/113 | | |
| 2008/0120471 A1 | 5/2008 | Blaschegg | | |
| 2008/0195812 A1 * | 8/2008 | Judd ........................... 711/114 | | |
| 2008/0215829 A1 * | 9/2008 | Lin et al. ..................... 711/155 | | |
| 2009/0157982 A1 * | 6/2009 | MacInnis et al. ............. 711/145 | | |

FOREIGN PATENT DOCUMENTS

| | | |
|---|---|---|
| JP | 2001-005725 | 1/2001 |
| KR | 10-2004-0076313 | 9/2004 |
| KR | 10-2007-0069346 | 7/2007 |
| KR | 10-2008-0037385 | 4/2008 |

* cited by examiner

*Primary Examiner* — Chun-Kuan Lee
*Assistant Examiner* — Jasjit Vidwan
(74) *Attorney, Agent, or Firm* — NSIP Law

(57) ABSTRACT

A memory device and a method of managing a memory are provided. The memory device includes a command queue configured to receive a first command from a host to store the first command, and to read and transmit the first command, a controller configured to read, from a storage device, data corresponding to the first command transmitted from the command queue, and to store the data in a buffer memory, and a first memory configured to store a data list of data stored in the buffer memory, wherein, in response to the command queue receiving the first command from the host, the controller updates the data list of data stored in the first memory.

19 Claims, 5 Drawing Sheets

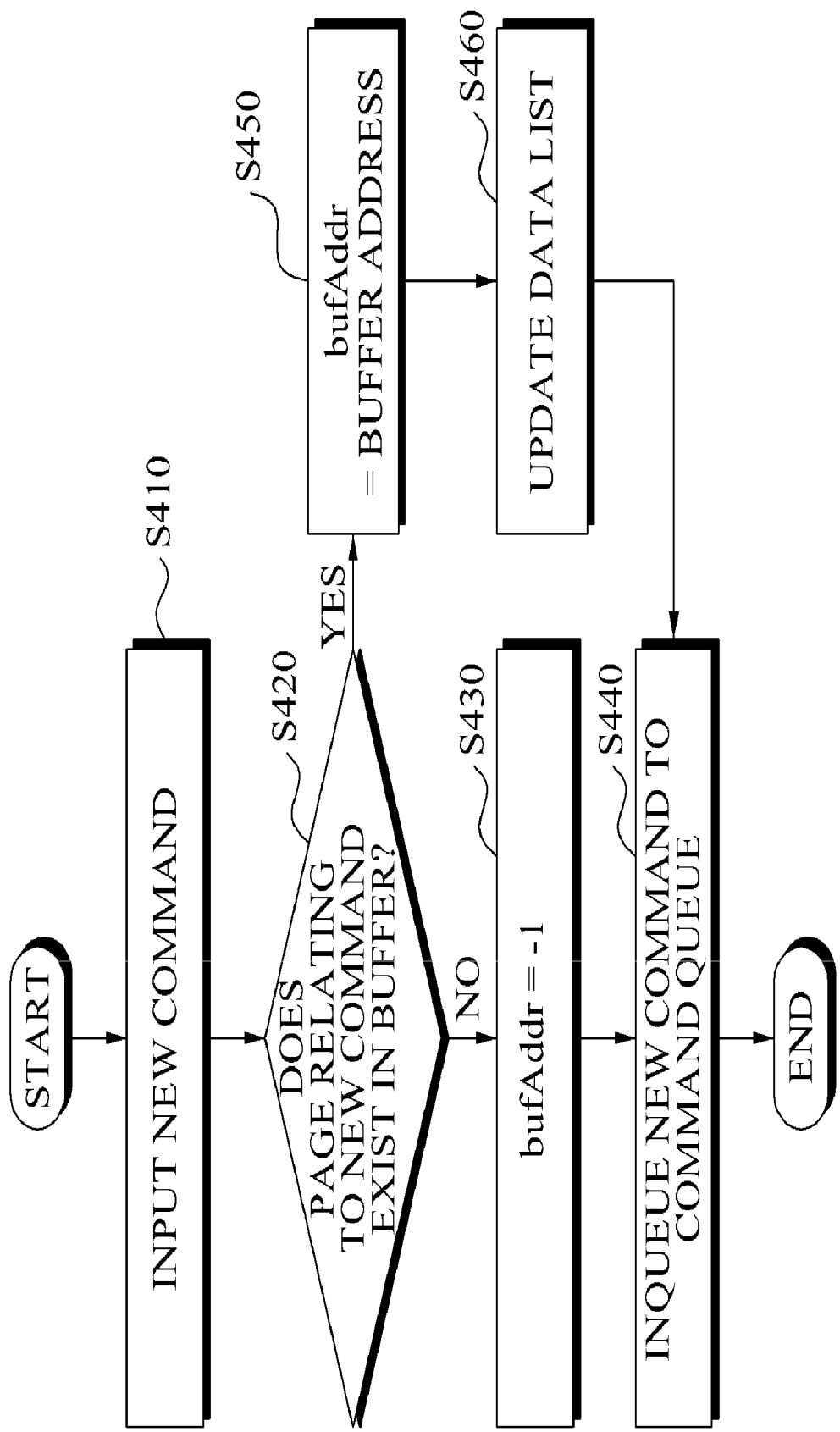

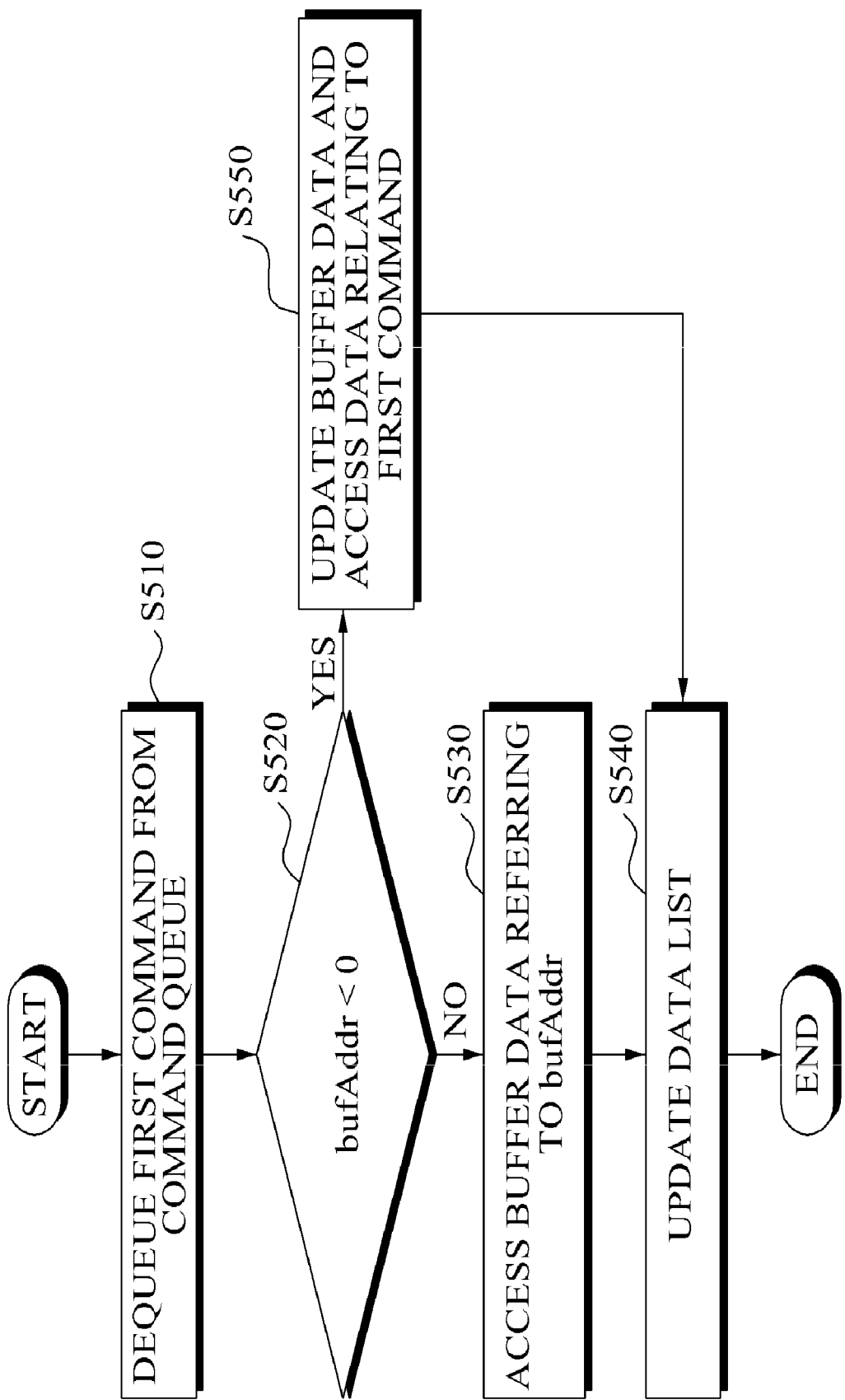

MEMORY DEVICE AND MANAGEMENT METHOD OF MEMORY DEVICE

CROSS-REFERENCE TO RELATED APPLICATION(S)

This application claims the benefit under 35 U.S.C. §119(a) of a Korean Patent Application No. 10-2008-0123217, filed on Dec. 5, 2008, in the Korean Intellectual Property Office, the entire disclosure of which is incorporated herein by reference.

BACKGROUND

1. Field

The following description relates to a memory device and a method of operating the memory device, and more particularly, to a memory device that manages a buffer in a storage device that uses a buffer memory and a method of managing the memory device.

2. Description of Related Art

Typically, a buffer memory compensates for a difference in speed between two different devices. A device with a relatively moderate speed may be utilized to reduce a delay time, where, for example, there is an interconnection between a device having a higher access speed and a device having a relatively slower access speed. As an example, a cache compensates for a difference in speed between a central processing unit (CPU) and a memory, and a buffer memory compensates for a difference in speed between a host and a storage device, and the like.

Since a cost of the buffer memory is high compared with increase of a processing rate, a memory having a relatively small capacity is used. As an example, a size of a buffer memory of a commonly used hard disk (HDD) is about 4 MB to 32 MB. Accordingly, it is desirable to have a buffer management method that stores data that is needed to be accessed in a short time and that deletes the remaining data, as the amount of data that is storable in a buffer in advance is generally not great.

A buffer management method is also referred to as a buffer replacement algorithm. A first-in first-out (FIFO) algorithm is an exemplary buffer replacement algorithm. FIFO is a method of deleting data from data stored first. Generally, a FIFO algorithm does not consider whether the data will be used in the future, but only considers a sequence of the data that is stored in the buffer. Accordingly, FIFO algorithm is easy implemented.

Another commonly used buffer management method is a least recently used (LRU) algorithm which deletes data where time has elapsed most since a host referred to the data compared to other data. While the LRU algorithm is a practical method, it is more difficult to implement than the FIFO algorithm.

An optimal replacement algorithm may be a method that retains only data that is needed to be accessed in the near future among data stored in a buffer and that deletes the other data. However, such an algorithm is hard to implement, and accordingly, there is need for a buffer replacement algorithm that is closer to an optimal replacement algorithm while being feasible.

SUMMARY

According to one general aspect, there is provided a memory device including a command queue configured to receive a first command from a host to store the first command, and to read and transmit the first command, a controller configured to read, from a storage device, data corresponding to the first command transmitted from the command queue, and to store the data in a buffer memory, and a first memory configured to store a data list of data stored in the buffer memory, wherein, in response to the command queue receiving the first command from the host, the controller updates the data list of data stored in the first memory.

The data list may include information of data stored in the buffer memory by arranging the data according to a sequence of the data that is recently used.

In response to the data corresponding to the first command that the command queue receives from the host existing in the data list, the controller may not read the data corresponding to the first command from the storage device, and may update the data list to change an arrangement of the data list to enable information of data that is most recently used in the data list to be information of the data corresponding to the first command.

In response to the data corresponding to the first command that the command queue receives from the host existing in the data list, the controller may store an address where the data corresponding to the first command exists in the buffer memory as a first parameter.

In response to the data corresponding to the first command that the command queue receives from the host not existing in the data list, the controller may store a value of the first parameter as a null.

In response to the first command being read from the command queue and performed, the controller may refer to the first parameter and reads data corresponding to the first command from the buffer memory.

In response to the command queue reading the first command to transmit the first command, the controller may update the data list stored in the first memory. The data list may include information of data stored in the buffer memory by arranging the data according to a sequence of the data that is most recently used.

In response to data corresponding to the first command read from the command queue existing in the data list, the controller may update the data list to change an arrangement of the data list to enable information of data that is most recently used in the data list to be information of data corresponding to the first command.

In another aspect, there is provided a method of managing a memory of a memory device, the method including determining whether a first command received from a host exists in a buffer memory of the memory device, and updating a data list of data stored in the buffer memory, in response to data corresponding to the first command existing in the buffer memory.

The data list may include information of data stored in the buffer memory by arranging the data according to a sequence of the data that is most recently used.

The updating of the data list may comprise changing arrangement of the data list so as to enable information of data corresponding to the first command to be located as information of the data that is most recently used in the data list.

The memory management method may further include storing an address of the data corresponding to the first command, the data being in the buffer memory, as a first parameter, in response to the data corresponding to the first command that a command queue of the memory device receives from the host existing in the data list.

The memory management method may further include referring to the first parameter and reading data corresponding to the first command from the buffer memory, in response to the first command being read from the command queue and performed.

The memory management method may further include storing a value of the first parameter as a null, in response to the data corresponding to the first command not existing in the data list.

The memory management method may further include reading data corresponding to the first command from the buffer memory and storing the data in the buffer memory, in response to the first command being read from the command queue and performed.

Other features and aspects will be apparent from the following detailed description, the drawings, and the claims.

BRIEF DESCRIPTION OF THE DRAWINGS

FIG. 4 is a flowchart illustrating an exemplary memory management method, where a new command is inputted.

FIG. 5 is a flowchart illustrating another exemplary memory management method.

Figure 1:
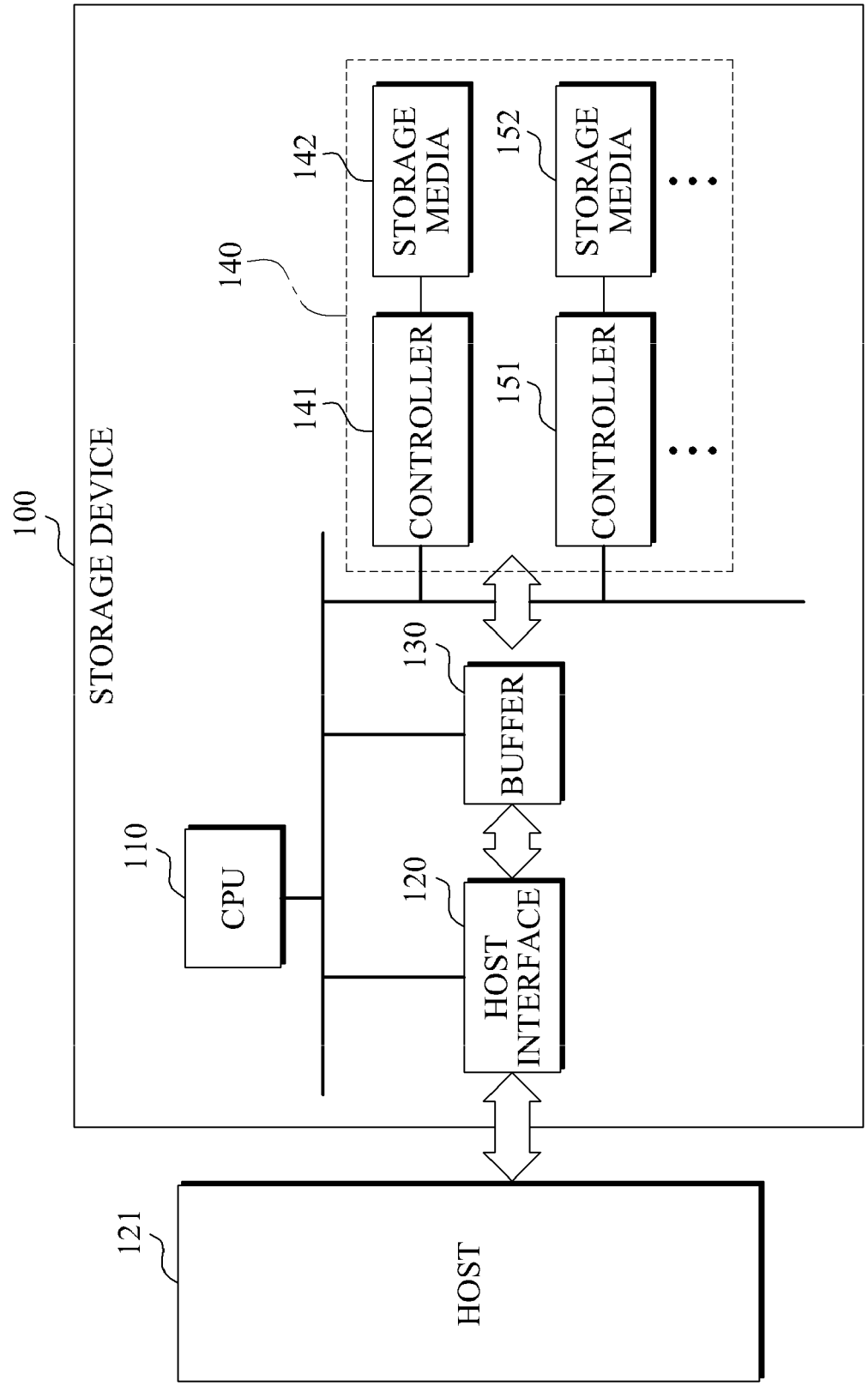
FIG. 1 illustrates an exemplary of a memory device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 shows an exemplary storage device 100 including a memory device.

The storage device 100 includes a CPU 110, a host interface 120, a buffer memory 130, and a data storage unit 140.

The storage device 100 may be, for example, a solid state disk (SSD) including a flash memory. The SSD is a device for embodying a high capacity storage using a plurality of flash memory chips.

The storage device 100 may receive a command, such as read, write, and the like, from the host 121 via the host interface 120. The host interface 120 may be a communication standard, such as a parallel Advanced Technology Attachment (PATA), a serial ATA (SATA), and a universal serial bus (USB), and the like. Also, the host 121 may be any electronic device, such as a personal computer, a laptop, a digital camcorder, a digital camera, and the like.

The CPU 110 of the storage device 100 may play a role in controlling communication and each part of the storage device 100. The CPU 110 may operate using a driving OS, such as firmware, real-time OS, and the like, and depending on an embodiment, the CPU 110 may play a role of a controller described herein. It is understood that the role of the controller may not be performed by the CPU 110, and while not illustrated, the controller may be embodied by a separate module.

The buffer memory 130 may temporarily store a portion of data read from the storage unit 140 and provide the data to the host 121. The buffer memory 130 may be a volatile memory, as an example, DRAM or SRAM. However, depending on the application, the buffer memory 130 may be a non-volatile memory.

The buffer memory 130 may be stored in the DRAM, together with a command queue, a first memory that stores a data list, and the like.

The data storage unit 140 may be, for example, a flash memory. A flash memory may be a NAND flash memory or a NOR flash memory. It is understood that this is only an illustration and that the data storage unit 140 may not be limited to a flash memory, and that a different implementation is possible where the application is a memory that records data.

The data storage unit 140 may include a plurality of channels, and each of the plurality of channels may include a memory controller 141 or 151 and a storage media 142 or 152. In the example of the flash memory, the storage media 142 or 152 may be a flash memory chip.

An exemplary procedure of processing a command received from the host 121 via the host interface 120 in the memory device will be described with reference to FIG. 2 through FIG. 5.

Figure 2:
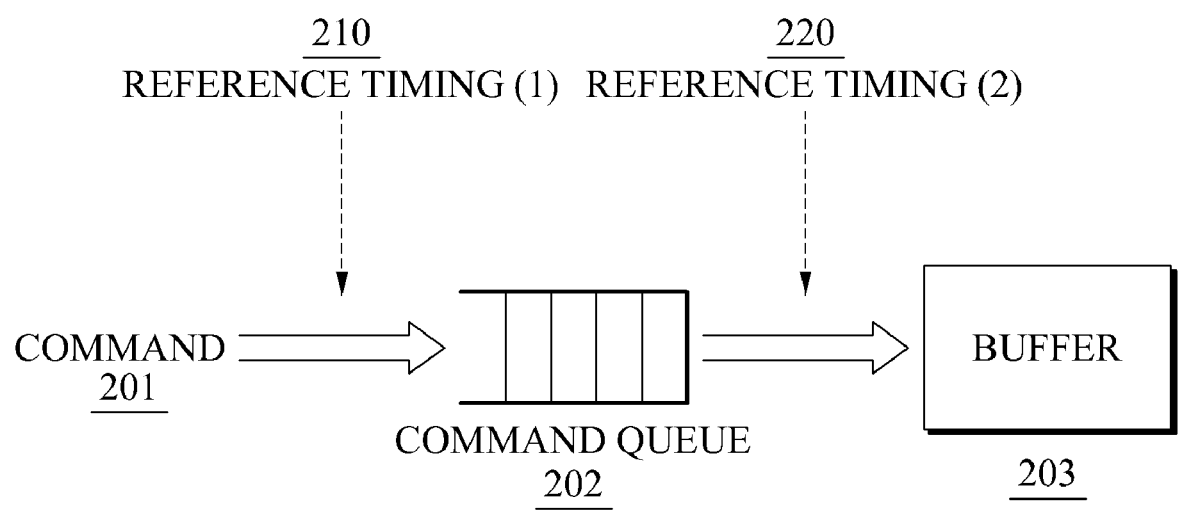
FIG. 2 illustrates an exemplary method of updating a buffered-data list (hereinafter, also referred as "data list") in a memory device.

FIG. 2 illustrates an exemplary method of updating a data list in a memory device.

A command is inputted to a command queue 202. A process of storing the command inputted to the command queue may be referred to as an inqueue. Hereinafter, a process where the command is inputted to the command queue is referred to as an inqueue, and conversely, a process where the command stored in the command queue is read is referred to as dequeue.

In the method, whether a first data corresponding to a first command 201 inqueued during a reference timing (1) 210 is stored in a buffer memory 203 is determined. A case where the first data corresponding to the first command 201 is stored in the buffer memory 203 may be referred to as a case where a buffer hit occurs. And a case where the buffer hit does not occur may be referred to as a case where a buffer miss occurs. To improve the performance of the buffer memory 203, a possibility of the buffer hit should be high, that is, a possibility of the buffer miss should be reduced.

With respect to the first command 201, whether a buffer bit occurs during the reference timing (1) 210 is determined. Where the buffer hit occurs during the reference timing (1) 210, a controller, which may be, for example, a CPU 110 of FIG. 1, updates a data list (not illustrated).

The data list is a list including information of data stored in the buffer memory 230. The data list may store identification information of the data or an index of the data, as a list, the data being stored in the buffer memory.

For example, the data list stores the identification information, such as a page address of a flash memory, of the data stored in the buffer memory 203 according to a sequence of the data that is most recently accessed by a host (hereinafter, "accessed" is referred to as "used").

As an example, in response to identification information of data corresponding to the first command 201 inqueued to the command queue 202 existing in the data list during the reference timing (1) 210, the controller determines that a buffer hit occurs with respect to the first command 201.

In this case, the controller changes an arrangement of the data list, that is, rearranging the data list to enable the identification information of the data corresponding to the first command 201 to be at a position of indication information of data that is most recently used.

Also, where a buffer hit occurs with respect to the first command 201 during the reference timing (1) 210, the controller stores an address of the data corresponding to the first command 201, the data being in the buffer memory, as a first parameter.

Where a buffer hit does not occur with respect to the first command 201 during the reference timing (1) 210, the controller stores a value of the first parameter as a null. The null indicates that the data corresponding to the first command 201 is not stored in the buffer memory 203, and the null may vary depending on initialization.

As an example, initializing "−1" which is not able to be an address of a buffer memory, as the null, is possible. In this case, where the buffer hit does not occur with respect to the first command 201 during the reference timing (1) 210, the controller may store the value of the first parameter corresponding to the first command 201 as "−1".

Referring back to FIG. 2, the controller once again determines whether a buffer hit occurs with respect to the first command 201 during a reference timing (2) 220 in which the first command 201 is dequeued from the command queue 202 and is processed.

The controller determines whether the first command 201 is stored in a buffer 203 referring to the data list. Where the identification information of the data corresponding to the first command 201 exists in the data list, it is determined that a buffer hit occurs during the reference timing (2) 220.

In this case, the controller changes an arrangement of the data list to enable the identification information of the data corresponding to the first command 201 to be at a position of identification information of data that is most recently used.

Where the identification information of the data corresponding to the first command 201 does not exist in the data list during the reference timing (2) 220, it is determined that a buffer hit does not occur during the reference timing (2) 220.

The controller refers to the value of the first parameter corresponding to the first command 201 in the operation in which the first command 201 is dequeued from the command queue 202 and is processed. Where the value of the first parameter corresponding to the first command 201 is not null, it is determined that the buffer hit occurs during the reference timing (1) 210. In this case, the value of the first parameter corresponding to the first command 201 is an address where the data corresponding to the first command 201 is stored, in the buffer memory 203.

Accordingly, the controller may read the data corresponding to the first command 201 from the address of the buffer memory 203. The method may increases the reading rate for the data corresponding to the first command.

A process where the controller updates the data list during the reference timing (1) 210 and the reference timing (2) 220 will be described with reference to FIG. 3.

Figure 3:
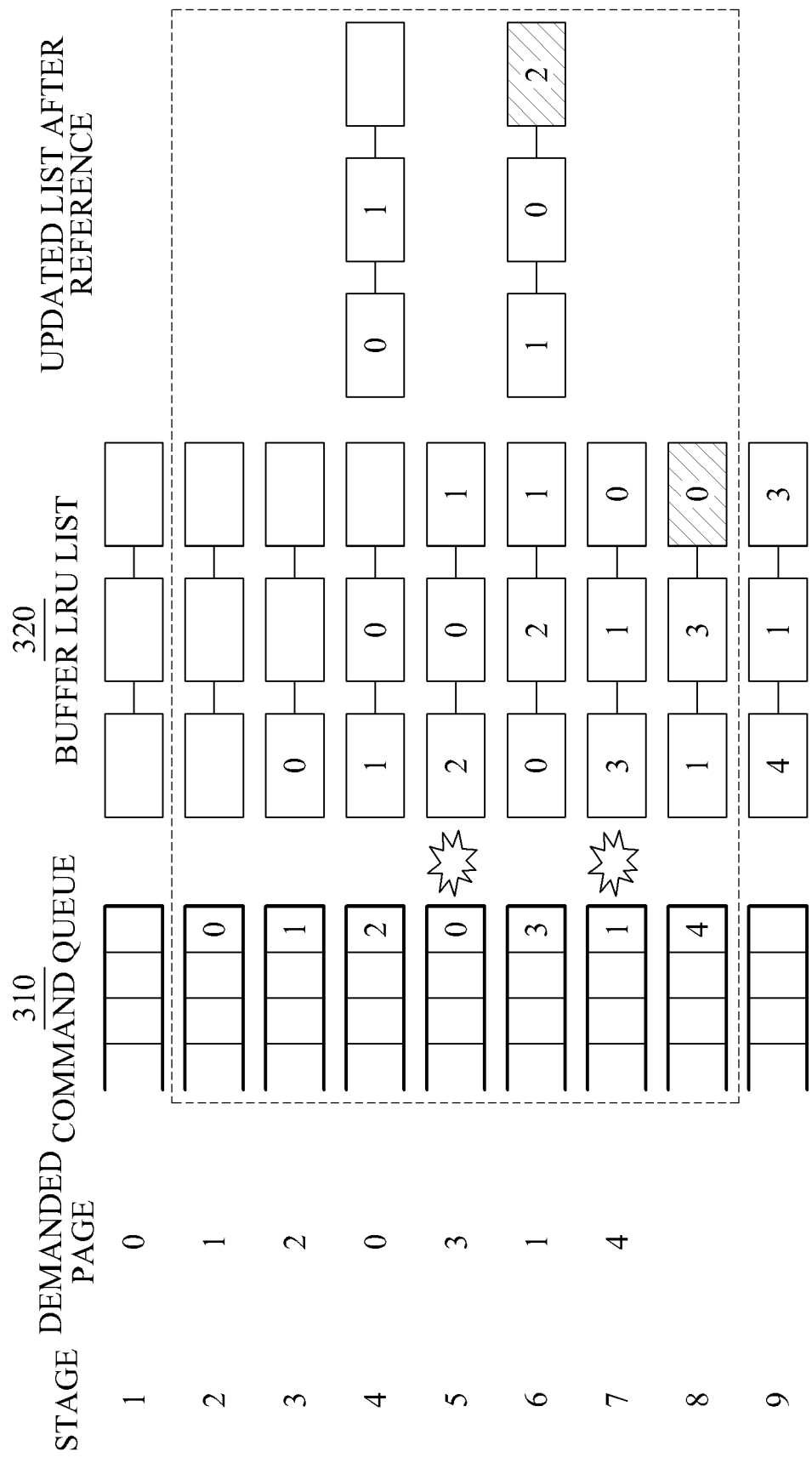
FIG. 3 illustrates an exemplary method where a data list is updated in a memory device.

FIG. 3 illustrates an exemplary method where a data list is updated in a memory device.

In FIG. 3, for ease of description, the reference term "STAGE" indicates a sequence over time and corresponds to a clock of the memory device or to a single operation cycle.

The reference term "DEMANDED PAGE" indicates a page address where data, stored in a storage media 142 or 152, that a host intends to access.

A command queue 310 is a storage space that is capable of storing a predetermined number of commands. The command queue may occupy a portion of a buffer memory 130 of FIG. 1, and may exist in a separate storage space such as DRAM, SRAM, and the like which is a volatile RAM.

In FIG. 3, for ease of description, it is assumed that the command queue 310 only stores a single command. However, this is only for an illustration, and the command queue 310 is not limit to storing a single command. It is apparent to one skilled in the art that a configuration of command queue 310 may variously change.

Also, a buffer list 320 is a data list that includes identification information of data stored in a buffer memory 203 of FIG. 2. Although, for ease of description, it is described that the buffer list 320 includes only three indexes in FIG. 3, again, it is not limited thereto.

In stage 1, the command queue and the buffer list 320 are empty. Also, a controller receives an access command with respect to a page 0 from a host. Where the access command with respect to the page 0 is received, the controller checks whether identification information of data corresponding to the page 0 exists in the buffer list 320. In a current buffer list 320, the identification information of the page 0 does not exist. Accordingly, the buffer list 320 is not updated.

In this case, the controller may store a value of a first parameter corresponding to the command with respect to the page 0 as a null, such as "−1", in the description with reference to FIG. 2.

In stage 2, the command with respect to the page 0 is inqueued to the command queue 310. Also, a command with respect to a page 1, which is a new command, is received. In this case, the controller checks whether identification information of data corresponding to the page 1 exists in the buffer list 320. In the present buffer list, the identification information with respect to the page 1 does not exist. Accordingly, the buffer list 320 is not updated.

In the same manner, the controller may store the value of the first parameter corresponding to the page 1 as a null.

In stage 3, the command with respect to the page 0 is dequeued from the command queue 310, and the controller checks whether the identification information of the data corresponding to the page 0 exists in the buffer list 320. The identification information with respect to the page 0 does not exist in the present buffer list 320, and thus, it is a case where a buffer hit does not occur.

Subsequently, the controller reads the data corresponding to the page 0 from the storage device, stores the data in the buffer memory 203, and updates the buffered-data list 320 to enable the page 0 to be a most recently used page in the buffered data list 320.

The command with respect to the page 1 is inqueued to the command queue 310. Also, a command with respect to a page 2, which is a new command, is received. In this case, the controller checks whether identification information of data corresponding to the page 2 exists in the buffer list 320. In the present buffer list 320, the identification information with respect to the page 2 does not exist. Accordingly, the buffer list 320 is not updated.

Also, the controller may store a value of a first parameter corresponding to the command with respect to the page 2 as a null.

In stage 4, the command with respect to the page 1 is dequeued from the command queue 310, and the controller checks whether the identification information of the data corresponding to the command with respect to the page 1 exists in the buffer list 320. The identification information with respect to the page 1 does not exist in the present buffer list 320, and thus, it is a case where a buffer hit does not occur.

Subsequently, the controller reads the data corresponding to the page 1 from the storage device, stores the data in the buffer memory 203, and updates the buffered-data list 320 to enable the page 1 to be the most recently used page in the buffered-list 320. Then, a sequence of the buffer list is [1, 0].

The command with respect to the page 2 is inqueued to the command queue 310. Also, a command with respect to the page 0, which is a new command, is received. In this case, the controller checks whether identification information of data corresponding to the page 0 exists in the buffer list 320. The identification information with respect to the page 0 exists in the present buffer list 320. Accordingly, the controller updates the buffer list 320 to rearrange the buffered-data list 320 to enable the page 0 to be the most recently used page. Then, the sequence of the buffer list 320 is [0, 1].

Also, the controller may store a buffer memory address where the data corresponding to the page 0 is stored as the value of the first parameter corresponding to the command with respect to the page 0.

In stage 5, the command with respect to the page 2 is dequeued from the command queue 310, and the controller checks whether the identification information of the data corresponding to the command with respect to the page 2 exists in the buffer list 320. The identification information with respect to the page 2 does not exist in the present buffer list 320, and thus, it is a case where a buffer hit does not occur.

Subsequently, the controller reads the data corresponding to the page 2 from the storage device, stores the data in the buffer memory 203, and updates the buffered-data list 320 to enable the page 2 to be the most recently used page in the buffered-data list 320. Then, the sequence of the buffer list 320 is [2, 0, 1].

The command with respect to the page 0 is inqueued to the command queue 310. Also, a command with respect to a page 3, which is a new command, is received. In this case, the controller checks whether identification information of data corresponding to the page 3 exists in the buffer list 320. The identification information with respect to the page 3 does not exist in the buffer list 320, and thus, the buffer list 320 is not updated. Accordingly, the sequence of the buffer list 320 is still [2, 0, 1].

Also, the controller may store a value of a first parameter corresponding to the command with respect to the page 3 as a null.

In stage 6, the command with respect to the page 0 is dequeued from the command queue 310, and the controller checks whether the identification information of the data corresponding to the command with respect to the page 0 exists in the buffer list 320. The identification information with respect to the page 0 exists in the buffer list 320, and thus, it is a case where a buffer hit occurs.

Subsequently, the controller may not read the data corresponding to the page 0 from the storage device. The controller may read the data of the page 0 stored in the buffer memory 203 referring to the value of the first parameter corresponding to the command with respect to the page 0. Accordingly, the controller updates the buffered-data list 320 to enable the page 0 to be the most recently used page in the buffered-data list 320. Then, the sequence of the buffer list 320 is [0, 2, 1].

The command with respect to the page 3 is inqueued to the command queue 310. Also, a command with respect to the page 1, which is a new command, is received. In this case, the controller checks whether identification data of data corresponding to the page 1 exists in the buffer list 320. The identification information with respect to the page 1 exists in the present buffer list 320. Accordingly, the controller updates the buffer list 320 to change an arrangement of the buffered-data list 320 to enable the page 1 to be the most recently used page. Then, the sequence of the buffer list 320 is [1, 0, 2].

Also, the controller may store a buffer memory address where the data corresponding to the page 1 is stored as the value of the first parameter corresponding to the command with respect to the page 1.

In stage 7, the command with respect to the page 3 is dequeued from the command queue 310, and the controller checks whether the identification information of the data corresponding to the page 3 exists in the buffer list 320. Since the identification information with respect to the page3 does not exist in the present buffer list 320, it is a case where a buffer hit does not occur.

Subsequently, the controller reads the data corresponding to the page 3 from the storage device, and stores the data in the buffer memory 203. However, since the buffer 203 is full, the controller deletes, from the buffer memory 203, the data corresponding to the page 2 that is the least recently used page referring to the buffer list. Also, the controller reads the data corresponding to the page 3 from the storage device and stores the data in the buffer memory 203. Also, the controller updates the buffered-data list 320 to enable the page 3 to be the most recently used page in the buffer list 320. Then, the sequence of the buffer list 320 is [3, 1, 0].

The command with respect to the page 1 is inqueued to the command queue 310. Also, a command with respect to a page 4, which is a new command, is received. In this case, the controller checks whether identification information of data corresponding to the page 4 exists in the buffer list 320. In the present buffer list 320, the identification information with respect to the page 4 does not exist. Accordingly, the buffer list 320 is not updated. Still, the sequence of the buffer list 320 is [3, 1, 0].

Also, the controller may store the value of the first parameter corresponding to the command with respect to the page 4 as a null.

In stage 8, the command with respect to the page 1 is dequeued from the command queue 310, and the controller checks whether the identification information of the data corresponding to the page 1 exists in the buffer list 320. Since the identification information with respect to the page 1 exists in the buffer list 320, it is a case where a buffer hit occurs.

Subsequently, the controller may not need to read the data corresponding to the page 1 from the storage device. The controller may read the data of the page 1 stored in the buffer memory 203 referring to the value of the first parameter corresponding to the command with respect to the page 1. Accordingly, the controller updates the buffered-data list 320 to enable the page 1 to be the most recently used page in the buffer list 320. Then, the sequence of the buffer list 320 is [1, 3, 0].

The command with respect to the page 4 is inqueued to the command queue 310. A new command is not received in stage 8.

In stage 9, the command with respect to the page 4 is dequeued from the command queue 310, and the controller checks whether the identification information of the data corresponding to the command with respect to the page 4 exists in the buffer list 320. Since the identification information with respect to the page 4 does not exist in the present buffer list 320, it is a case where a buffer hit does not occur.

Subsequently, the controller reads the data corresponding to the page 4 from the storage device and stores the data in the buffer memory 203. However, since the buffer 203 is full, the controller deletes, from the buffer memory 203, the data corresponding to the page 0 that is the least recently used page referring to the buffer list. Also, the controller reads the data corresponding to the page 4 from the storage device and stores the data in the buffer memory 203.

Also, the controller updates the buffered-data list 320 to enable the page 4 to be the most recently used page in the buffer list 320. Then, the sequence of the buffer list 320 is [4, 1, 3].

FIG. 4 is a flowchart illustrating an exemplary memory management method, where a new command is inputted.

In operation S410, the new command is inputted.

In operation S420, the controller determines whether a page relating to the new command exists in a buffer memory 203.

Where the page relating to the new command does not exist in the buffer memory 203, the controller stores a value of a first parameter (bufAddr) corresponding to the new command as a null having a value of "−1" in operation S430.

In operation S440, the controller inqueues the new command to a command queue.

Also, where the page relating to the new command exists in the buffer memory 203, the controller stores a value of a buffer memory address where the page relating to the new command is stored, as the value of the first parameter.

In operation S460, the controller updates the buffeded-data list to rearrange the data list to enable the data corresponding to the new command to be the most recently used data. Then, in operation S440, the new command is inqueued to the command queue.

Descriptions of operations S410 to S460 have been described with reference to FIG. 3 and thus, will be omitted herein for conciseness.

FIG. 5 is a flowchart illustrating another exemplary memory management method.

In operation S510, a first command is dequeued from a command queue.

In operation S520, the controller determines whether a value of a first parameter is a null. As described with reference to FIG. 4, where the value of the first parameter is "−1", the controller determines that the value of the first parameter is null. It is a case where data corresponding to the first command does not exist in a buffer memory 203.

Where the value of the first parameter is less than zero, the controller reads the data relating to the first command from a storage device and stores the data in the buffer memory 203 in operation S550. That is, the buffer memory 203 is updated.

Also, where the value of the first parameter is greater than or equal to zero, the controller reads data corresponding to the first command from the buffer memory 203 referring to the first parameter in operation S530.

In operation S540, the controller updates the buffeded-data list to rearrange the data list to enable the data corresponding to the first command to be the most recently used data.

Descriptions of operations S510 to S550 have been described with reference FIG. 3 and thus, will be omitted herein for conciseness.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Flash memory devices and/or memory controllers according to example embodiments may be embodied using various types of packages. For example, the flash memory devices and/or memory controllers may be embodied using packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Quad Flatpack (QFP), Plastic Metric Quad Flat Pack (MQFP), Thin Quad Flatpack (TQFP), Small Outline Integrated Circuit (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), and the like.

The flash memory devices and/or the memory controllers may constitute memory cards. In this case, the memory controllers may be constructed to communicate with an external device for example, a host using any one of various types of protocols such as a USB, a Multi Media Card (MMC), a Peripheral Component Interconnect-Express (PCI-E), SATA, PATA, Small Computer System Interface (SCSI), Enhanced Small Device Interface (ESDI), and Integrated Drive Electronics (IDE).

The flash memory devices may be non-volatile memory devices that can maintain stored data even where power is cut off. According to an increase in the use of mobile devices such as a cellular phone, a personal digital assistant (PDA), a digital camera, a portable game console, and an MP3 player, the flash memory devices may be more widely used as data storage and code storage. The flash memory devices may be used in home applications such as a high definition television (HDTV), a DVD, a router, and a Global Positioning System (GPS).

A computing system according to example embodiments may include a microprocessor that is electrically connected with a bus, a user interface, a modem such as a baseband chipset, a memory controller, and a flash memory device. The flash memory device may store N-bit data via the memory controller. The N-bit data is processed or will be processed by the microprocessor and N may be 1 or an integer greater than 1. Where the computing system is a mobile apparatus, a battery may be additionally provided to supply operation voltage of the computing system.

It will be apparent to those of ordinary skill in the art that the computing system according to example embodiments may further include an application chipset, a camera image processor (CIS), a mobile DRAM, and the like. The memory controller and the flash memory device may constitute an SSD that uses a non-volatile memory to store data.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A memory device, comprising:
   a command queue configured to receive a first command from a host, to store the first command, and to read and transmit the first command;
   a buffer memory configured to store a data list of data; and
   a controller configured to read, from a storage device, data corresponding to the first command transmitted from the command queue, to store the data in the buffer memory, to update the data list of data stored in the buffer memory, and to determine whether a buffer hit occurs with respect to the first command by determining whether an identification (ID) of the first command is stored in the data list stored in the buffer memory,
   wherein the controller is further configured to determine again whether a buffer hit occurs with respect to the first command by determining whether the ID of the first command is stored in the data list stored in the buffer memory, in response to the first command being dequeued from the command queue.

2. The memory device of claim 1, wherein the data list includes information of data stored in the buffer memory and the data is arranged according to a sequence of the data that is most recently used.

3. The memory device of claim 2, wherein, in response to the data corresponding to the first command that the command queue receives from the host already existing in the data list, the controller does not read the data corresponding to the first command from the storage device, and the controller updates the data list to change an arrangement of the data list to set the data corresponding to the first command as the most recently used data.

4. The memory device of claim 2, wherein, in response to the data corresponding to the first command already existing in the data list, the controller stores an address of the data corresponding to the first command that exists in the buffer memory, as a first parameter.

5. The memory device of claim 4, wherein, in response to the data corresponding to the first command not existing in the data list, the controller stores a value of the first parameter as a null.

6. The memory device of claim 4, wherein, in response to the first command being read from the command queue and being performed, the controller refers to the first parameter and reads data corresponding to the first command from the buffer memory.

7. The memory device of claim 1, wherein, in response to the command queue reading the first command to transmit the first command, the controller updates the data list stored in the first memory.

8. The memory device of claim 7, wherein the data list includes information of data stored in the buffer memory and the data is arranged according to a sequence of the data that is most recently used.

9. The memory device of claim 8, wherein, in response to the data corresponding to the first command read from the command queue existing in the data list, the controller updates the data list to change an arrangement of the data list to enable information of data that is most recently used in the data list to be information of data corresponding to the first command.

10. A method of managing a memory of a memory device, the method comprising:
    receiving a first command from a host;
    determining whether a buffer hit occurs with respect to the first command received from the host by determining whether an identification (ID) of the first command is stored in a data list that is stored in a buffer memory of the memory device;
    storing the first command in a command queue of the memory device;
    updating the data list stored in the buffer memory, if the ID corresponding to the first command is stored in the data list stored in the buffer memory; and
    determining again whether a buffer hit occurs with respect to the first command by determining whether the ID of the first command is stored in the data list stored in the buffer memory, in response to the first command being dequeued from the command queue.

11. The method of claim 10, wherein the data list includes information of data stored in the buffer memory and the data is arranged according to a sequence of the data that is most recently used.

12. The method of claim 11, wherein the updating of the data list comprises changing the arrangement of the data list to set information of data corresponding to the first command to be located as information of the data that is most recently used in the data list.

13. The method of claim 10, further comprising:
    storing an address of the data corresponding to the first command as a first parameter, in response to data corresponding to the first command being stored in the data list.

14. The method of claim 13, further comprising:
    referring to the first parameter and reading data corresponding to the first command from the buffer memory, in response to the first command being read from the command queue and being performed.

15. The method of claim 10, further comprising:
    storing a value of the first parameter as a null, in response to the data corresponding to the first command not existing in the data list.

16. The method of claim 15, further comprising:
    reading data corresponding to the first command from the buffer memory and storing the data in the buffer memory, in response to the first command being read from the command queue and being performed.

17. A computer-readable storage medium storing a program to manage a memory of a memory device, the program comprising instructions to cause a computer to implement a method comprising:
    receiving a first command from a host;
    determine whether a buffer hit occurs with respect to the first command received from the host by determining whether an identification (ID) of the first command is stored in a data list that is stored in a buffer memory of the memory device;
    storing the first command in a command queue of the memory device;
    updating the data list of data stored in the buffer memory, if the ID corresponding to the first command is stored in the data list stored in the buffer memory; and
    determining again whether a buffer hit occurs with respect to the first command by determining whether the ID of the first command is stored in the data list stored in the buffer memory, in response to the first command being dequeued from the command queue.

18. The computer-readable storage medium of claim 17, wherein the data list includes information of data stored in the buffer memory and the data is arranged according to a sequence of the data that is most recently used.

19. The computer-readable storage medium of claim 17, further comprising an instruction to store an address of the data corresponding to the first command as a first parameter, in response to the data corresponding to the first command being stored in the data list.

* * * * *